July 24, 1956 — L. T. GARNETT — 2,755,812
AIR-OPERATED RATE UNIT FOR CONTROLLER
Filed June 3, 1952 — 3 Sheets-Sheet 1

*INVENTOR.*
LAWRENCE T. GARNETT
BY Arthur H. Swanson
ATTORNEY.

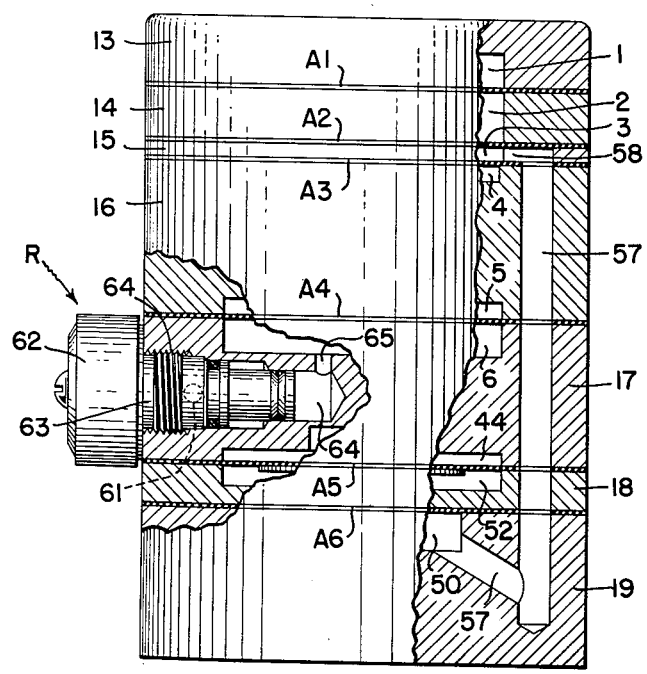

July 24, 1956 — L. T. GARNETT — 2,755,812
AIR-OPERATED RATE UNIT FOR CONTROLLER
Filed June 3, 1952 — 3 Sheets-Sheet 3

*INVENTOR.*
LAWRENCE T. GARNETT
BY
ATTORNEY.

United States Patent Office 2,755,812
Patented July 24, 1956

2,755,812

AIR-OPERATED RATE UNIT FOR CONTROLLER

Lawrence T. Garnett, Hatboro, Pa., assignor to Minneapolis-Honeywell Regulator Company, Minneapolis, Minn., a corporation of Delaware Application June 3, 1952, Serial No. 291,547

11 Claims. (Cl. 137—85)

This invention relates to air-operated controllers or units thereof which provide a rate or derivative action. Rate or derivative action or mode of controller operation is defined in Mechanical Engineering for February, 1946, and in a pamphlet reprinted therefrom and published by The American Society of Mechanical Engineers, 29 West 39th Street, New York 18, New York. A copy of this pamphlet is in the United States Patent Office.

Modern automatic control of industrial processes make it necessary that the rate amplitude be high, 15 or above. In the prior art controllers, the rate compensation has been obtained by ratioing the areas of diaphragm motors directly. This necessitates that one of the areas so proportioned to another must be very large or very small. In the present device the area of one such motor diaphragm is ratioed against the difference between two other such areas. Thus it is quite simple to make this ratio a high number.

Accordingly, it is an object of this invention to provide an air-operated controller in which the area of one motor diaphragm operates against the difference between the areas of two other motor diaphragms.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 4 is a side elevation view in the direction of the arrows 5—5 of Fig. 3.

Fig. 5 is a longitudinal cross section on the line 5—5 of Fig. 3 viewed in the direction of the arrows.

Fig. 6 is a longitudinal cross section on the line 6—6 of Fig. 3 viewed in the direction of the arrows with parts shown in side elevation.

Theoretical considerations

A pure or ideal (uncompensated) rate unit has a transfer function ($P_{out}/P_{in}$) equal to $T_R$ multiplied by $S$ plus one, where $T_R$ is the rate time and $S$ is the operator $d/dt$.

In response to a finite step change in input, an ideal rate unit produces an infinite output signal and 90 degrees of phase lead is obtained. However, the presence of noise (spurious signals) in processes being controlled dictates the use of a rate unit in which the magnitude of the output signal is limited to a contant multiplied by the magnitude of the input step. In this invention, this compensation is achieved by providing an immediate follow-up to limit the response to a step input change such that delta $P_{out}/P_{in}$ equals $A1/(A2-A3)$. The rate amplitude, $A1/(A2-A3)$ is a constant that can be changed only by a change of parts. Final follow-up is achieved by causing the output pressure to bleed through a rate time restriction (for setting rate time) and acting against area $A4$ to rebalance the controller. For a constant input signal, the output signal will be equal to it if the area differences, ($A1-A4$) and ($A2-A3$) are equal.

Figure 1:
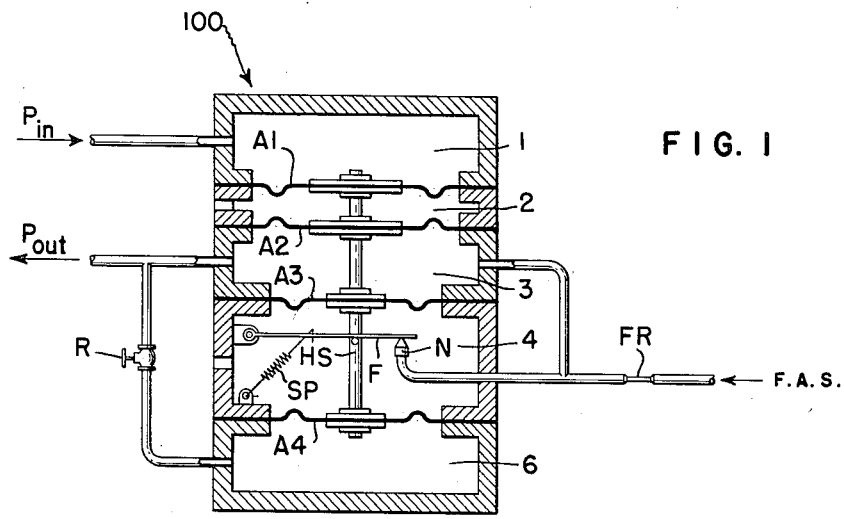
Fig. 1 is a diaphragm simplified by the omission of the relay used in the actual, physical embodiment of the invention.

Referring to Fig. 1 it will be seen that this invention comprises a controller having a case, generally indicated at 100 and disclosed in detail in Figs. 3–8. Casing 100 is divided into chambers 1, 2, 3, 4, 5, and 6 by diaphragms which are designated by the symbol $A1$, $A2$, $A3$, and $A4$, respectively. For convenience in the mathematical discussion disclosed herein, these symbols are also used to designate the areas of these diaphragms. That variable of the process under control (the measured variable) to which it is desired to have the controller respond is measured by a measuring instrument which transforms the measured variable into a variable air pressure. There are many such measuring instruments well known in this art for transforming pressure, temperature, rate of flow, and many other variables into a variable air pressure. Since they are well known, such a measuring instrument is not shown herein. This variable air pressure $P_{in}$ is the process variable signal which is fed to chamber 1. Chamber 2 between diaphragms $A1$ and $A2$ is small and open to the atmosphere. Diaphragms $A1$, $A2$, $A3$, and $A4$ are connected together by a shaft, generally designated HS. The construction of this shaft is disclosed in detail in Figs. 5 and 9. Air or other elastic fluid from a source of filtered air supply F. A. S. is fed through a fixed restriction FR to a nozzle (generally designated N) controlled by a flapper F biased by a spring SP towards engagement with nozzle N. Any difference between the pressures in chamber 1, 3, and 6 causes shaft HS to move flapper F relative to nozzle N and vary the pressure from source F. A. S. which is supplied to chamber 3. This pressure is the process variable signal ($P_{out}$). It may be fed directly to the diaphragm motor of a final controlled element or may be fed into a motor chamber of an air-operated controller. Such air-operated valves and such air-operated controllers are well known and are therefore not illustrated herein. This output pressure $P_{out}$ is also bled back by a rate time restriction R to chamber 6.

Diaphragms $A3$ and $A4$ are slightly smaller than diaphragms $A1$ and $A2$. If desired, the sizes of these diaphragms may be such that $A1$ minus $A4$ equals $A2$ minus $A3$. By this means an immediate follow-up is obtained because the pressure $P_{in}$ acting on the diaphragm $A1$ is opposed to the pressure $P_{out}$ acting on an area equal to the difference between diaphragm $A2$ and diaphragm $A3$. This difference in area can be made as small as desired. The final follow-up is obtained by causing $P_{out}$ to bleed through the rate time restriction R to the chamber 6 where it acts on diaphragm $A4$.

Mathematical discussion

Figure 2:
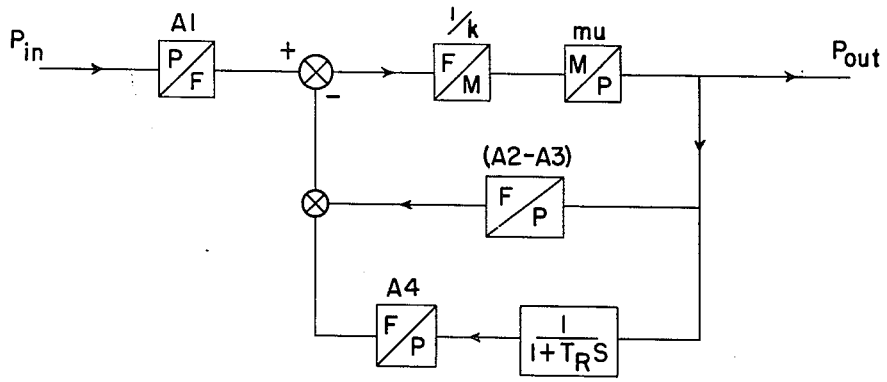
Fig. 2 is a block diagram.
Figure 3:
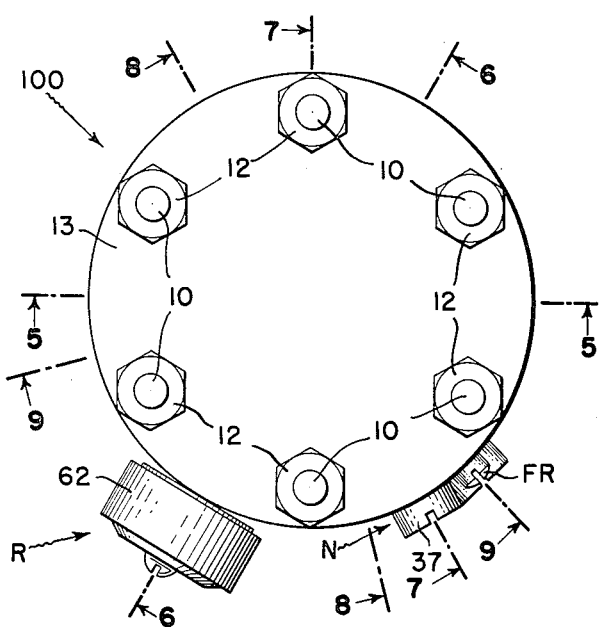
Fig. 3 is a top or plan view of one actual, physical embodiment of the invention.

Fig. 2 is a block diagram disclosing the mode of operation of the controller of this invention. This controller is designed to operate according to the following formula:

$$P_{out}/P_{in} = 1 \text{ plus } T_R S/1 + (A2-A3/A1)T_R S$$

where
$S$ = operator $d/dt$
$T_R$ = rate time
$A1/(A2-A3)$ = rate amplitude

In this block diagram the symbols $P_{in}$, $P_{out}$, A1, A2, A3, A4, S, and $T_R$ have already been defined. The symbol P signifies a pressure, the symbol F signifies a force, the symbol $k$ is a constant signifying the gradient of a spring. mu is a symbol for the gain in force, and the symbol M signifies a motion.

Tracing through the diagram of Fig. 2: $P_{in}$ is converted in chamber 1 from a pressure P to a force F by acting on diaphragm A1. This force F is applied to the shaft or stud HS and is changed to a motion M with a component equal to $1/k$ which is the gradient of a spring. This motion is translated back to pressure P by means of flapper F and nozzle N with a gain symbolized by the reference character mu. This pressure ($P_{out}$) is fed to the chamber 3 where it is converted to a force F by acting on the difference in area between the diaphragms A2 and A3. The pressure $P_{out}$ is also fed through rate time restriction R so that it has a component $1/1+T_R S$ which is fed to the chamber 6 where the pressure is applied to the diaphragm A4 and converted to a force F. These forces are fed back in opposition to the force from chamber 2.

*Physical construction of the device*

Referring to Figs. 3–8, it will be seen that this controller comprises a case, generally indicated by the reference character 100, made up of a plurality of rings or discs held together by a plurality of bolts 10 (Fig. 8) each having inner screw threaded end 11 and a nut 12 at the outer or exposed end thereof. These rings or discs are designated by the reference characters 13, 14, 15, 16, 17, 18, and 19, respectively.

Fig. 5 shows that $P_{in}$ enters input port 20 in ring 16 and passes through a conduit 21 in rings 16, 15, 14, and 13 to chamber 1 where it acts on diaphragm A1.

Figure 9:
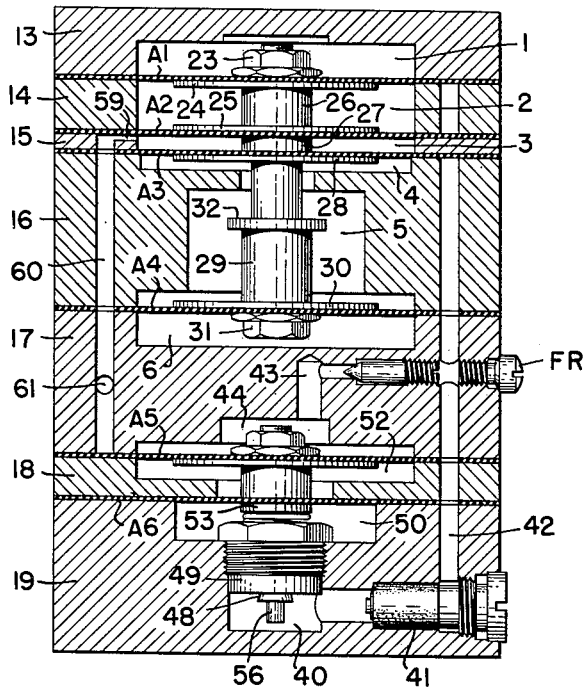
Fig. 9 is a longitudinal cross section on the line 9—9 of Fig. 3 viewed in the direction of the arrows.

Figs. 5 and 9 show that the shaft HS is made up of a central shaft 22 having screw threaded ends. At the upper end nuts 23 hold diaphragm A1 against a disc 24 in chamber 2. Disc 24 is separated from disc 25 by a perforated cylinder 26. Perforated cylinder 27 in chamber 3 holds diaphragm A2 away from diaphragm A3 and holds diaphragm A3 against disc 28. An elongated perforated cylinder 29 presses at its upper end against disc 28, and, at its lower end, against disc 30 which holds diaphragm A4 against nuts 31 in chamber 6.

Figure 7:
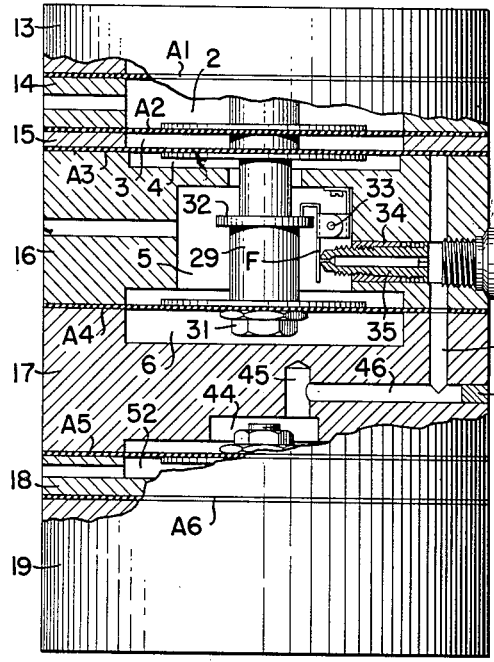
Fig. 7 is a longitudinal cross section on the line 7—7 of Fig. 3 viewed in the direction of the arrows with parts shown in side elevation.
Figure 8:
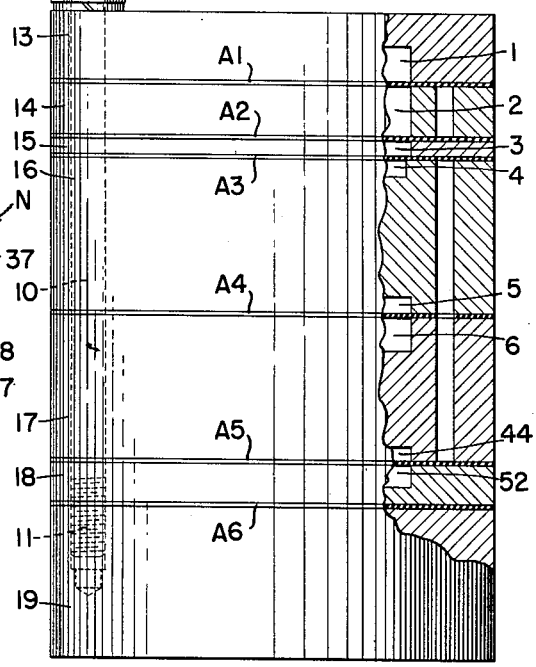
Fig. 8 is a longitudinal cross section on the line 8—8 of Fig. 3 viewed in the direction of the arrows with parts shown in side elevation.

Fig. 7 shows that cylinder 29 has an intermediate face 32 which bears on one end of flapper F. Flapper F is pivoted to ring 16 on a spring held pivot 33. A coil spring SP (not shown) biases flapper F against the end of nozzle, generally indicated N.

This nozzle N consists of an outer tube 34 shown in cross section and embracing an inner tube 35 having two diameters. The outer ends of these tubes are sealed by an O ring. A screw 37 seals an opening in ring 16 so that the passage 38 is air tight and communicates with the open end of tube 35.

Fig. 5 shows that ring 19 has an inlet port 39 therein. Port 39 is adapted for connection to a filtered air supply F. A. S. Port 39 leads to a central cavity 40.

Fig. 9 shows that central cavity 40 leads through filter 41 to a vertically extending conduit 42 through rings 19, 18, and 17 to a needle valve FR, which forms a fixed restriction. Conduit 43 in ring 17 leads to a central chamber 44 having two diameters. Air in chamber 44 acts on diaphragm A5 which forms part of a pilot valve or relay omitted from Fig. 1 for purposes of simplicity.

Fig. 7 shows that cavity 44 also communicates with conduit 45 connecting with conduit 46 which is plugged at one end by a cylinder 47 and which communicates with conduit 38 leading to nozzle N.

Returning to Fig. 5, hemispherical valve 48 cooperates with a stationary valve seat 49 to vary the admission of air from chamber 40 to a central chamber 50 communicating with an output port 51. Diaphragm A6 separates chamber 52 from chamber 50 on one side while diaphragm A5 separates chamber 52 from chamber 44 on the other side. Chamber 52 is open to the atmosphere. Diaphragms A5 and A6 carry at their center an exhaust valve 53 having a T-shaped exhaust port 54 therein. The foot or lower end of exhaust port 54 cooperates with the hemispherical end 55 of valve stem 56 which also carries hemispherical valve 48.

Fig. 6 shows that chamber 50 communicates with conduit 57 in rings 19, 18, 17, 16, and 15 where conduit 57 communicates through a horizontal conduit 58 with chamber 3.

Fig. 9 shows that chamber 3 communicates through horizontal passage 59 with vertical conduit 60 in rings 15, 16, and 17 and with a horizontal conduit 61 communicating with the rate time restriction R, as shown in Fig. 6. Restriction R comprises a handle 62 which is accessible from the outside of the controller and which is mounted on a stem 63 by means of screw threads 64 in ring 17. Conduit 61 communicates with the interior of stem 63 which contains a needle valve or other adjustable restriction (not shown). The opposite side of this adjustable restriction communicates through chamber 64 and vertical conduit 65 to chamber 6 beneath diaphragm A4.

*Operation*

When the measuring element (not shown) causes a change in input pressure $P_{in}$ in chamber 1, shaft HS causes flapper F to move relative to nozzle N. This causes a change in the nozzle pressure which is transmitted as is shown in Fig. 7, through the interior of tube 35, conduits 38, 46, and 45, to chamber 44. The change in pressure in chamber 44 causes diaphragm A5 to increase or decrease the pressure in chamber 50 (Fig. 5) by admitting air thereto or exhausting air therefrom. Fig. 6 shows that this change in pressure in chamber 50 is transmitted through conduits 57 and 58 to chamber 3. Since the area of diaphragm A2 is slightly greater than the area of diaphragm A3, an immediate follow-up is obtained which limits the output response (change in pressure $P_{out}$) to a preselected value. At the same time, the pressure in chamber 3, as is best seen in Figs. 9 and 6, passes through conduits 59, 60, and 61 to the rate restriction R, which causes a delay in the application of the output pressure $P_{out}$ through chambers 64 and 65 to chamber 6 and diaphragm A4. When the output pressure $P_{out}$ ceases to change, the pressure in chamber 6 equalizes with the pressure in chambers 1 and 3 and the controller unit stabilizes.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without corresponding use of other features.

Having now described my invention, what I claim as new and desire to secure by Letters Patent is as follows:

1. In an air-pressure controlled instrument responsive to a force proportional to a controlled variable and having an output air pressure, means causing said instrument to operate with rate mode of operation, said means including, a device, a first element connected so as to move said device in one direction in response to a first force proportional to variations in the value of the controlled variable, a second element comprising a first part connected so as to move said device in the opposite direction with a second force and a second part connected so as to move said device in said one direction with a third force, said second and third forces being always produced by the same air which is at the same pressure, the resultant of said second and third forces being smaller than said first force but in said opposite direction, a third element connected so as to move said device in said opposite direction with a fourth force intermediate in size between said first force and said resultant of said second and third forces, means operated by said device so as to vary said resultant force and said fourth force in the same sense as said first force upon movements of said first element, means applying said resultant force to said second element, means applying said fourth force to said third element, and means delaying the application of said fourth force to said third element, whereby said first force moves said device until said first force is counterbalanced by the sum of said resultant force and of said fourth force.

2. In an air-pressure controlled instrument, means having an output comprising a variable air pressure effective to cause rate action, said means including, a device, a first element having an effective area exposed to variable air pressure so as to move said device in one direction in response to variations in the value of a condition, a second element comprising a first part having an area exposed to a second variable air pressure and a second part having an area always exposed at the same instant to the same value of said second variable air pressure as said first part is and smaller than that of said first part so that the difference between the areas of said parts is an effective area such that the force produced by said second variable air pressure on said areas of said parts moves said device in the opposite direction, a third element having an effective area exposed to said second variable air pressure and intermediate in size between the effective areas of said first and second elements, so as to move said device in said opposite direction, means operated by said device so as to vary said second variable air pressure applied to said second element, means applying variations in said second variable air pressure to said third element, and means for delaying the application of said variations in said second variable air pressure to said third element, whereby said instrument, upon a deviation of said condition from normal, causes its output pressure to change more than is necessary to correct said deviation and thereafter causes said output pressure to stabilize at a value suitable to correct said deviation.

3. An air-pressure controlled instrument according to claim 2, in which the means operated by said device is a valve controlling said second variable air pressure.

4. An air-pressure controlled instrument according to claim 2, in which the elements and the parts are flexible diaphragms.

5. An air-pressure controlled instrument according to claim 2, in which the means delaying the application of variations in said second variable air pressure to said third element is a manually-adjustable valve.

6. In an air-pressure controlled instrument, means providing a variable air pressure to cause a rate action, which means include, a controller formed of a plurality of elements connected together in a stack and having internal cavities therein and conduits therethrough, a stud, a first flexible diaphragm interposed between two of the cavities and having an effective area of one face exposed to a first variable air pressure and connected to said stud so as to move it in one direction in response to variations in a value of a condition, a second flexible diaphragm interposed between two of the cavities and having an effective area of one face exposed to a second variable air pressure, a third flexible diaphragm interposed between two of the cavities and having an effective area of one face exposed to said second variable air pressure, and smaller than the effective area of said second diaphragm, said second and third flexible diaphragms being connected to said stud so that the resultant force caused by said second variable air pressure on said second and third flexible diaphragms moves said stud in the opposite direction, a fourth flexible diaphragm interposed between two of the cavities and having an effective area exposed to said second variable pressure and intermediate in size between the effective area of said first diaphragm and the difference between the effective areas of said second and third diaphragms and connected to said stud so as to move it in said opposite direction, means operated by said stud so as to vary said second variable air pressure, means applying said second air pressure to said second and to said third and to said fourth diaphragms, and means delaying the application of variations in said second variable air pressure to said fourth diaphragm, whereby said instrument, upon a deviation of said condition from normal, causes its output pressure to change more than is necessary to correct said deviation and thereafter causes said output pressure to stabilize at a value suitable to correct said deviation.

7. An air-pressure controlled instrument according to claim 6, in which the means operated by the stud is a valve controlling said second variable air pressure.

8. An air-pressure controlled instrument according to claim 6, in which the means delaying the application of variations in the second variable air pressure to the fourth diaphragm is a manually-adjustable valve.

9. An air-pressure controlled instrument according to claim 6, having an inlet port adapted for connection to a supply of air pressure, a conduit communicating with said inlet port, a restriction in said conduit causing a drop in pressure in the air flowing through said conduit, a nozzle communicating with said conduit on the low pressure side of said restriction, and a valve part operated by the stud to control the escape of air through said nozzle and thereby to vary said second variable air pressure.

10. An air-pressure controlled instrument according to claim 6, having rigid members connected to the stud and each bearing on one of the diaphragms so as to constitute the effective area of said diaphragm.

11. In an air-pressure controlled instrument, means having an output comprising a variable air pressure effective to cause rate action, said means including, a device, a first element having an area exposed to variable air pressure so as to move said device in one direction in response to variations in the value of a condition, a second element comprising a first part having an effective area exposed to a second variable air pressure and a second part having an effective area exposed to said second variable air pressure and smaller than that of said first part so that the force produced by said second variable air pressure on said effective areas of said parts moves said device in the opposite direction, a third element having an effective area exposed to said second variable air pressure to move said device in said opposite direction, means operated by said device so as to vary immediately said second variable air pressure applied to said second element, means applying variations in said second variable air pressure to said third element, and means delaying the application of said variations in said second variable air pressure to said third element, whereby the change in output air pressure of said instrument initially is magnified and thereafter is reduced.

References Cited in the file of this patent

UNITED STATES PATENTS

| | | |
|---|---|---|
| 2,286,282 | Joesting | June 16, 1942 |
| 2,360,889 | Philbrick | Oct. 24, 1944 |
| 2,441,405 | Fitch | May 11, 1948 |
| 2,517,051 | Stevenson | Aug. 1, 1950 |
| 2,520,547 | Hughes | Aug. 29, 1950 |
| 2,638,911 | Griswold | May 19, 1953 |

FOREIGN PATENTS

| | | |
|---|---|---|
| 544,643 | Great Britain | Apr. 22, 1942 |